(12) United States Patent
Matsuoka

(10) Patent No.: US 12,440,138 B2
(45) Date of Patent: Oct. 14, 2025

(54) ALERTING SYSTEM AND ALERTING METHOD

(71) Applicant: HONDA MOTOR CO., LTD., Tokyo (JP)

(72) Inventor: Takahiro Matsuoka, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 105 days.

(21) Appl. No.: 18/501,699

(22) Filed: Nov. 3, 2023

(65) Prior Publication Data
US 2024/0206788 A1    Jun. 27, 2024

(30) Foreign Application Priority Data

Dec. 26, 2022   (JP) ................. 2022-208289

(51) Int. Cl.
| | | |
|---|---|---|
| *A61B 5/18* | (2006.01) |
| *A61B 5/00* | (2006.01) |
| *A61B 5/16* | (2006.01) |
| *B60Q 9/00* | (2006.01) |
| *G06F 3/01* | (2006.01) |
| *G06N 20/00* | (2019.01) |

(52) U.S. Cl.
CPC ............... *A61B 5/18* (2013.01); *A61B 5/163* (2017.08); *A61B 5/6893* (2013.01); *A61B 5/7267* (2013.01); *A61B 5/746* (2013.01); *B60Q 9/00* (2013.01); *G06F 3/013* (2013.01); *G06N 20/00* (2019.01)

(58) Field of Classification Search
CPC ......... A61B 5/18; A61B 5/163; A61B 5/6893; A61B 5/7267; A61B 5/746; G06N 20/00; B60Q 9/00; G06F 3/013

USPC ......................................................... 340/439
See application file for complete search history.

(56) References Cited

U.S. PATENT DOCUMENTS

| | | | | |
|---|---|---|---|---|
| 10,783,725 B1* | 9/2020 | Gaudin | .................. | G07C 5/008 |
| 10,926,699 B2* | 2/2021 | Kapuria | .................. | H04N 25/71 |
| 2016/0373573 A1* | 12/2016 | Bivens | .................... | H04M 3/02 |
| 2017/0108925 A1* | 4/2017 | Mueller | ................. | G09G 5/006 |
| 2018/0059628 A1* | 3/2018 | Yoshida | ............. | G05B 23/0243 |

(Continued)

FOREIGN PATENT DOCUMENTS

JP        2020-35043 A        3/2020

*Primary Examiner* — Zhen Y Wu
(74) *Attorney, Agent, or Firm* — Rankin, Hill & Clark LLP

(57) ABSTRACT

An alerting system includes: a notification unit, when a gaze dwell time of a driver exceeds a predetermined threshold, executing a notification at a predetermined conspicuousness level to the driver via an HMI device; a decision unit deciding on a notification parameter set including parameters defining a notification output timing and the conspicuousness level; a behavior recording unit recording presence/absence of a reactive behavior to the notification executed using the notification parameter set; and a reaction information recording unit recording reaction information where a reaction ratio, which is a ratio of the number of the notifications to which the reactive behavior occurs to the number of the notifications executed, is associated with each different notification parameter set, wherein the decision unit calculates and decides on, based on the reaction information, an optimal parameter set with which the reaction ratio is estimated to become the highest.

12 Claims, 7 Drawing Sheets

(56) References Cited

U.S. PATENT DOCUMENTS

| | | | |
|---|---|---|---|
| 2020/0122741 A1* | 4/2020 | Kuehnle | B60W 50/14 |
| 2020/0290639 A1* | 9/2020 | Kuehnle | B60W 50/14 |
| 2021/0237743 A1* | 8/2021 | Boström | B60W 40/08 |
| 2022/0005349 A1* | 1/2022 | Schulz | G01C 21/3476 |
| 2022/0135050 A1* | 5/2022 | Egashira | A61B 5/6893 |
| | | | 701/1 |
| 2022/0144302 A1* | 5/2022 | Takei | B60W 50/14 |
| 2024/0199082 A1* | 6/2024 | Balch | B60W 60/0055 |
| 2024/0300412 A1* | 9/2024 | Israel | B60Q 3/74 |

* cited by examiner

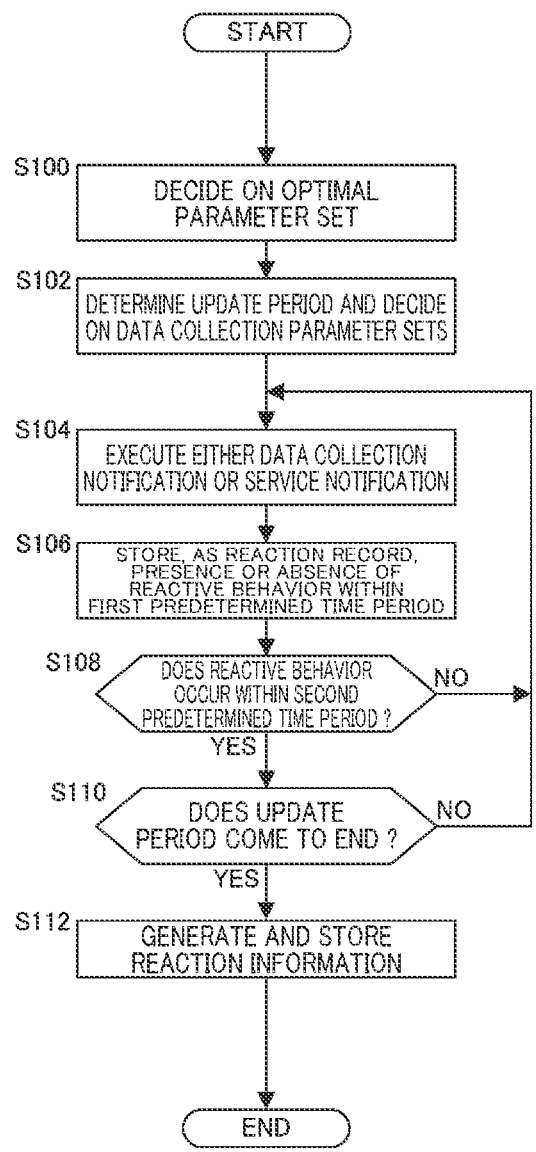

ALERTING SYSTEM AND ALERTING METHOD

INCORPORATION BY REFERENCE

The present application claims priority under 35 U.S.C. § 119 to Japanese Patent Application No. 2022-208289 filed on Dec. 26, 2022. The content of the application is incorporated herein by reference in its entirety.

BACKGROUND OF THE INVENTION

Field of the Invention

The present invention relates to an alerting system and an alerting method for alerting a driver of a vehicle.

Description of the Related Art

In recent years, initiatives have intensified to provide access to sustainable transportation systems that give consideration also to people, who are in a vulnerable position among traffic participants. To this end, efforts are focused on research and development that further improves traffic safety and convenience through research and development related to active safety.

Japanese Patent Laid-Open No. 2020-35043 discloses an inattentive driving notification device that alerts a driver of a vehicle when it is determined that the driver stays inattentive for a predetermined time period or longer while the vehicle in automatic driving is changing lanes.

Incidentally, a challenge to be addressed in active safety is that at an intersection or the like where drivers' attention to a traffic environment, such as movement of other traffic participants, is even more important, a sign of a distracted state of a driver is notified to the driver as early as possible to urge the driver to concentrate on driving behavior.

When a distracted state is notified to a driver early on, the notification is executed in a situation where it is not always possible to definitely determine the distracted state. Accordingly, it is also important that a stimulus (a visual, auditory, and/or tactile stimulus) given to the driver for the notification should be easily recognizable and acceptable to the driver while the stimulus should be restrained from bothering the driver.

To achieve such a trade-off, it is conceivable to change forms in which the stimulus is presented, according to an attentional state or driving behavior of the driver. However, a human sense to the stimulus (for example, the degree of readiness to accept or an uncomfortable feeling) differs among individuals, and considering only the attentional state or driving behavior of the driver cannot be said to be sufficient to give consideration to the viewpoint of the acceptability of a notification to the driver.

To solve the above problem, an object of the present application is to notify a driver that the driver has a sign of a distracted state, in a form easily acceptable to the driver. By extension, a contribution is made to the development of sustainable transportation systems.

SUMMARY OF THE INVENTION

One aspect of the present invention is an alerting system including: a gaze measurement unit that measures a gaze dwell time of a driver of a vehicle; and a notification unit that, when the measured gaze dwell time exceeds a predetermined threshold, executes a notification at a predetermined conspicuousness level to the driver via an HMI device, the alerting system further including: a decision unit that decides on a notification parameter set including a parameter defining an output timing of outputting the notification and a parameter defining the conspicuousness level of the notification outputted from the HMI device; a behavior recording unit that, when the notification unit executes the notification at the output timing and the conspicuousness level indicated by the decided notification parameter set, records whether or not a reactive behavior of the driver to the notification occurs; and a reaction information recording unit that calculates a reaction ratio with respect to each of the different notification parameter sets and records, in a storage device, reaction information in which the notification parameter set and the reaction ratio are associated, the reaction ratio being a ratio of the number of times the driver exhibits the reactive behavior in response to the notification to the number of the notifications executed, wherein the decision unit calculates and decides on an optimal parameter set, based on relations between the notification parameter sets and the reaction ratios indicated by the reaction information, the optimal parameter set being the notification parameter set with which the reaction ratio is estimated to become the highest.

According to another aspect of the present invention, the decision unit further determines an update period and decides on at least one data collection parameter set, the update period being a period until the decided optimal parameter set is updated next, the data collection parameter set being the notification parameter set to be exclusively used for data collection, executes the notifications by selectively using the decided optimal parameter set and the decided data collection parameter set during the update period in cooperation with the notification unit, the behavior recording unit, and the reaction information recording unit, and obtains the reaction information with respect to the used optimal parameter set and the used data collection parameter set.

According to another aspect of the present invention, the update period is set as a period with a predetermined length of time, or a period during which a predetermined number of the notifications are executed by the notification unit.

According to another aspect of the present invention, the decision unit generates execution order information that defines in what order the notification unit executes the notification using the optimal parameter set and the notification using the data collection parameter set, for a plurality of the notifications to be executed within the update period, and the notification unit executes the notification by selecting and using the optimal parameter set or the data collection parameter set in accordance with the execution order information.

According to another aspect of the present invention, the alerting system further includes a learning unit that causes a driver reaction model to learn, through machine learning, the relations between the notification parameter sets and the reaction ratios, based on the reaction information, wherein the decision unit decides on the optimal parameter set with which the reaction ratio is estimated to become the highest, by using the driver reaction model.

According to another aspect of the present invention, the gaze measurement unit measures the gaze dwell time of the driver when the vehicle enters an intersection, and/or when the vehicle passes an intersection.

According to another aspect of the present invention, the gaze measurement unit measures the gaze dwell time of the driver by using eye tracking based on a face image of the driver from a camera included in a vehicle cabin of the vehicle.

According to another aspect of the present invention, presence or absence of the reactive behavior is determined based on whether or not an amount of gaze movement between two temporally consecutive points of gaze, in gaze movement of the driver, is a predetermined amount or more, and/or whether or not a size of a range of gaze movement of the driver is a predetermined size or more.

According to another aspect of the present invention, the HMI device includes a tactile HMI device, an auditory HMI device, and/or a visual HMI device.

According to another aspect of the present invention, the alerting system further includes a server device communicably connected to the vehicle, wherein the server device includes the decision unit and the reaction information recording unit, and the vehicle includes the gaze measurement unit and the notification unit.

According to another aspect of the present invention, the decision unit, the reaction information recording unit, the gaze measurement unit, and the notification unit are included in the vehicle.

Still another aspect of the present invention is an alerting method that is executed by a computer of an alerting system in which a notification is given from an HMI device to a driver of a vehicle, the alerting method including: a gaze measurement step of measuring a gaze dwell time of the driver of the vehicle; and a notification step of, when the measured gaze dwell time exceeds a predetermined threshold, executing a notification to the driver via the HMI device, the alerting method further including: a decision step of deciding on a notification parameter set including a parameter defining an output timing of outputting the notification and a parameter defining a conspicuousness level of the notification outputted from the HMI device; a behavior recording step of, when the notification is executed in the notification step at the output timing and the conspicuousness level indicated by the decided notification parameter set, recording whether or not a reactive behavior of the driver to the notification occurs; and a reaction information recording step of calculating a reaction ratio with respect to each of the different notification parameter sets and recording, in a storage device, reaction information in which the notification parameter set and the reaction ratio are associated, the reaction ratio being a ratio of the number of times the driver exhibits the reactive behavior in response to the notification to the number of the notifications executed, wherein in the decision step, an optimal parameter set is calculated and decided on based on relations between the various notification parameter sets and the reaction ratios, the optimal parameter set being the notification parameter set with which the reaction ratio is estimated to become the highest.

According to the aspects of the present invention, it can be notified that a driver has a sign of a distracted state, in a form easily acceptable to the driver.

BRIEF DESCRIPTION OF THE DRAWINGS

FIG. 7 is a flowchart showing a procedure for an alerting method executed by the alerting system.

DETAILED DESCRIPTION OF THE PREFERRED EMBODIMENTS

Hereinafter, embodiments of the present invention are described with reference to the drawings.

Figure 1:
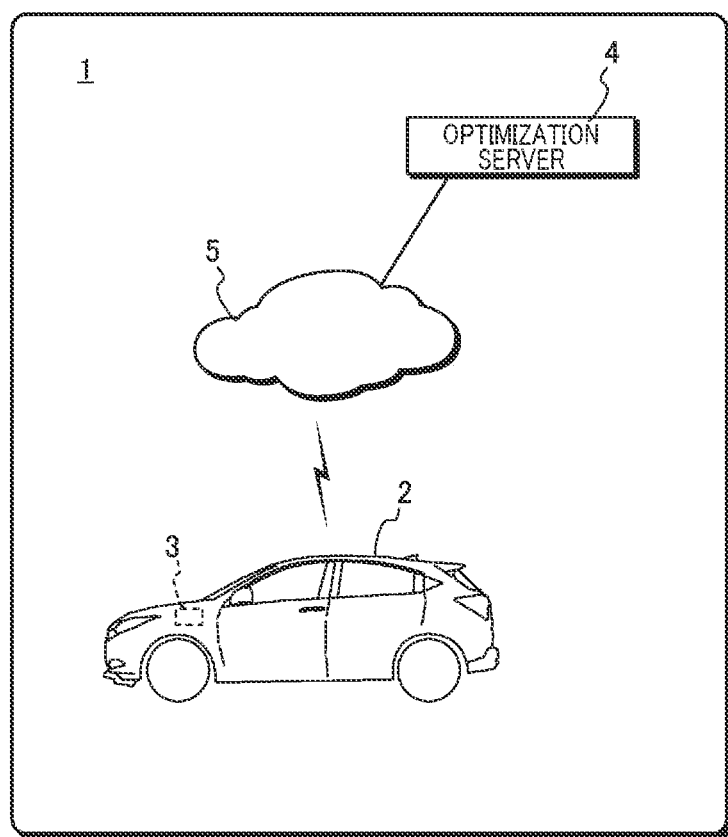
FIG. 1 shows a configuration of an alerting system according to an embodiment of the present invention.
Figure 2:
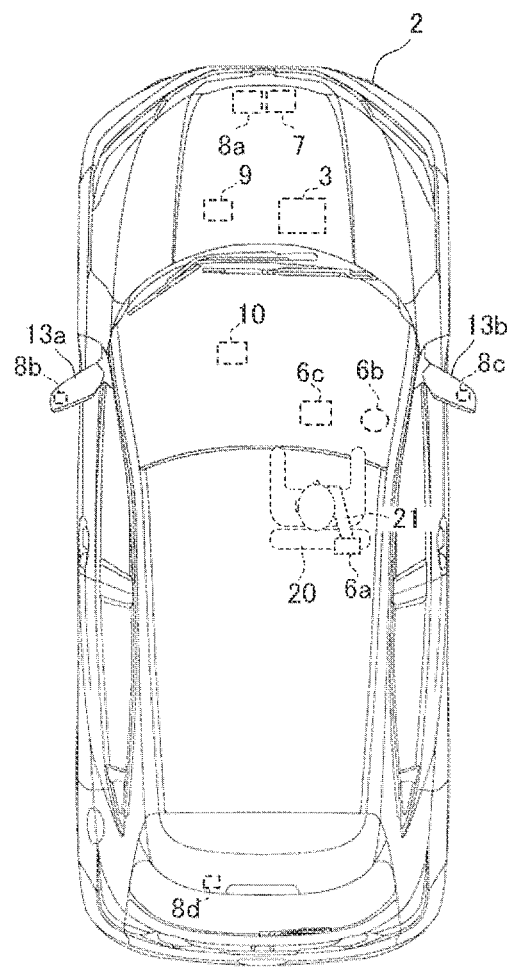
FIG. 2 shows a configuration of a vehicle in which an alerting device included in the alerting system is mounted.
Figure 3:
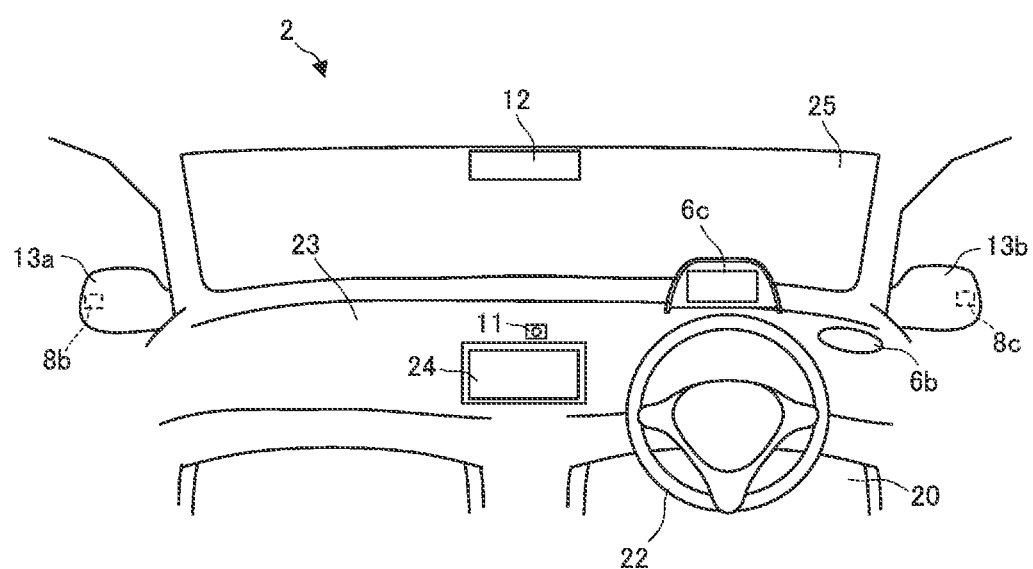
FIG. 3 shows a configuration of a vehicle cabin of the vehicle in which the alerting device is mounted.

FIG. 1 shows a configuration of an alerting system 1 according to one embodiment of the present invention. FIG. 2 shows a configuration of a vehicle 2 in which the alerting system 1 is mounted, and FIG. 3 shows a configuration of a vehicle cabin of the vehicle 2.

[Configuration of Alerting System]

The alerting system 1 includes an alerting device 3 mounted in the vehicle 2, and an optimization server 4 that is a server device provided outside of the vehicle 2. For example, the alerting device 3 and the optimization server 4 are communicably connected to each other via a communication network 5 such as the Internet.

[Configuration of Vehicle]

Figure 5:
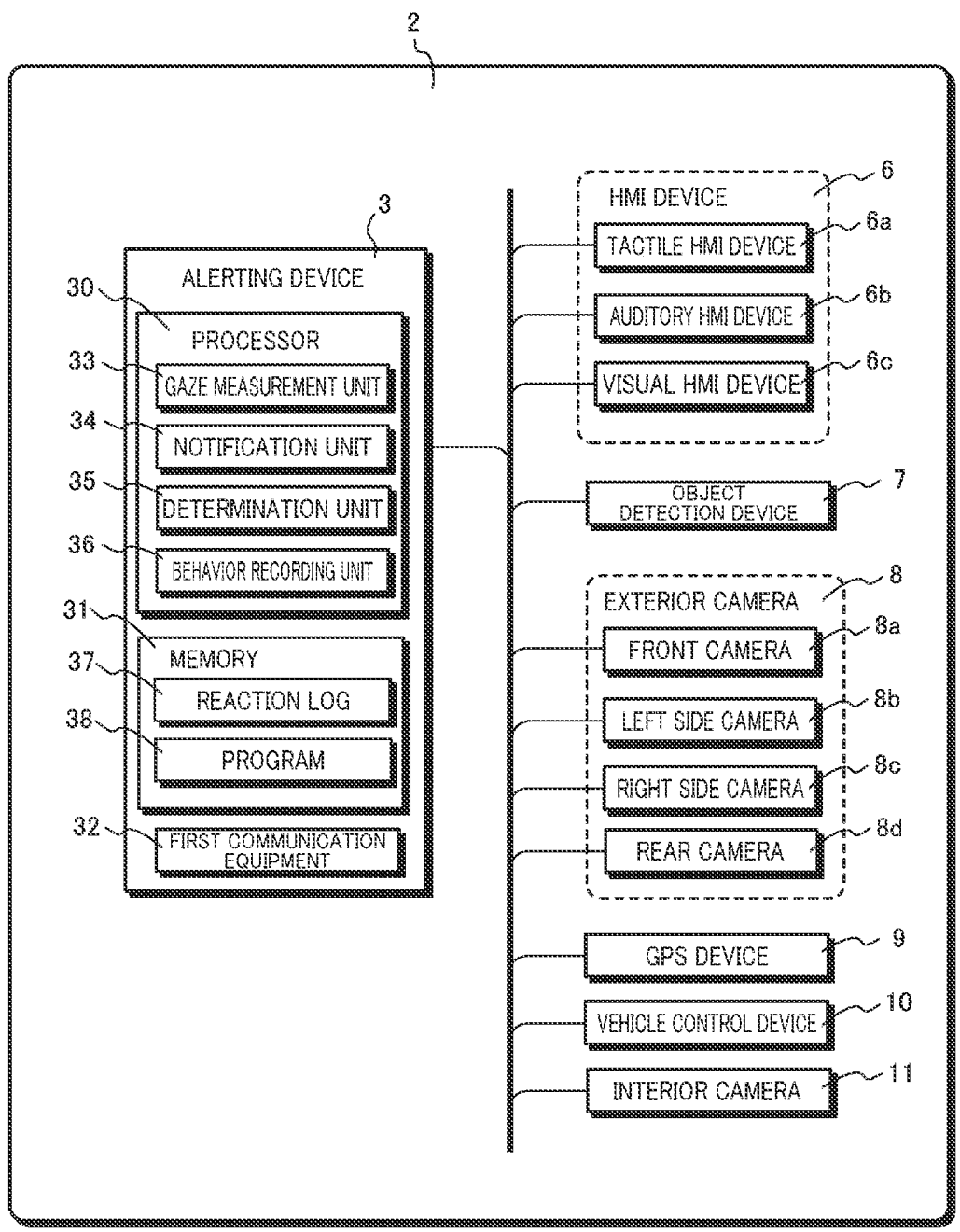
FIG. 5 shows a configuration of the alerting device included in the alerting system.

The vehicle 2 includes an HMI (Human Machine Interface) device 6 (FIG. 5). In the present embodiment, the HMI device 6 includes a tactile HMI device 6a providing a stimulus to a sense of touch of a driver, an auditory HMI device 6b outputting sound that is an auditory stimulus to the driver, and a visual HMI device 6c transmitting visual information to the driver. However, such a configuration is an example, and the HMI device 6 may include any one, or any two, of the tactile, auditory, and visual HMI devices.

The tactile HMI device 6a is, for example, an electric seat belt installed at a driver seat 20 of the vehicle 2 and gives a tactile stimulus to the driver by changing tensile force of the seat belt 21 worn by the driver. However, the electric seat belt is an example, and the tactile HMI device 6a can be any device that can give a tactile stimulus to the driver. For example, the tactile HMI device 6a may be an oscillatory actuator that imparts vibrations to the hands of the driver via a steering wheel 22, or may be a massage seat that is installed as the driver seat 20 and gives a stimulus to a body part such as the back of the driver, for example, by patting, kneading, pressing, or imparting vibrations.

In the present embodiment, the auditory HMI device 6b is a single-unit speaker. Alternatively, the auditory HMI device 6b may be a speaker system including a plurality of speakers.

In the present embodiment, the visual HMI device 6c is an instrumentation display device provided in a dashboard 23 of the vehicle 2. However, the instrumentation display device is an example, and the visual HMI device 6c can be a general-purpose display device 24 that displays others than instruments, or a head-up display (not shown) that displays an image on a windshield 25.

Moreover, the vehicle 2 includes an object detection device 7 that detects an object in an ambient environment around the vehicle 2, an exterior camera 8 (FIG. 5) that acquires an image of the ambient environment, and a GPS device 9. For example, the object detection device 7 can be a radar, a lidar, and/or a sonar that is provided in a front portion of a vehicle body of the vehicle 2 and detects an object in a front environment in front of the vehicle 2

(hereinafter, also referred to as a front object). In addition, the object detection device 7 may include a plurality of cameras, radars, lidars, and/or sonars deployed in a distributed manner over the vehicle body of the vehicle 2, and may detect an object in the entire ambient environment including environments on the right and left sides of and behind the vehicle 2.

The exterior camera 8 includes a front camera 8a that is provided in the front portion of the vehicle body of the vehicle 2 and captures an image of the front environment in front of the vehicle 2, a left side camera 8b and a right side camera 8c that are provided on left and right side-view mirrors 13a and 13b, respectively, and capture images of side environments on the left and right sides of the vehicle 2, respectively, and a rear camera 8d that is provided in a rear portion of the vehicle body and captures an image of a rear environment behind the vehicle 2.

The vehicle 2 further includes a vehicle control device 10 (computer) that detects operation states of steering controls, such as an accelerator pedal, a brake pedal, turn signal lamps, and the steering wheel of the vehicle 2, and also detects kinetic states, such as vehicle speed, acceleration, and a yaw rate of the vehicle 2.

Furthermore, the vehicle 2 includes an interior camera 11 that captures an image of a vehicle cabin including the driver, and a rear-view mirror 12 for the driver to see rearward of the vehicle 2 with eyes. The rear-view mirror 12 may be a rear-view mirror that displays a video from the rear camera 8d capturing images behind the vehicle 2.

[Outline of Operation of Alerting System]

Figure 4:
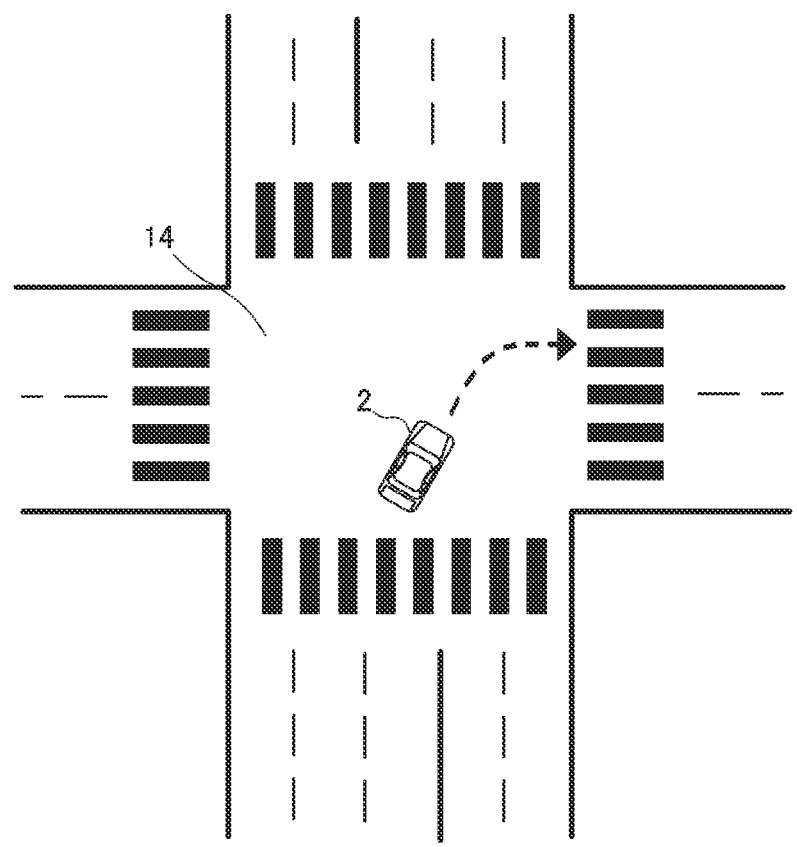
FIG. 4 shows an example of a scene in which the alerting system operates.

In the alerting system 1, the alerting device 3 and the optimization server 4 cooperate in notifying the possibility of a distracted state to the driver of the vehicle 2. For example, in the alerting system 1, when the possibility of the driver being in a distracted state is detected when the vehicle 2 passes an intersection 14 as shown in FIG. 4, a notification is given to the driver by outputting a tactile stimulus, an auditory stimulus (for example, sound), and/or visual information (for example, light) from the HMI device 6.

Specifically, the alerting device 3 executes the notification to the driver of the vehicle 2 via the HMI device 6 in a form defined by a notification parameter set (which will be described later) received from the optimization server 4 when the possibility of a distracted state reaches a predetermined level. The HMI device 6 used to give the notification can be any one, or a combination of any two or more, of the tactile HMI device 6a, the auditory HMI device 6b, and the visual HMI device 6c.

The optimization server 4 optimizes the notification parameter set in such a manner that the acceptability of the notification, which the alerting device 3 executes by using the HMI device 6, to the driver increases. Here, in the present embodiment, the degree of the acceptability is a reaction ratio, which is the ratio of the number of times the driver exhibits a reactive behavior in response to a notification to the number of notifications given from the HMI device 6.

The optimization server 4 performs data collection operation for optimizing the notification parameter, and service operation of executing a notification by using the further optimized notification parameter set.

In the data collection operation, the optimization server 4 generates a data collection parameter set, which is a notification parameter set to be exclusively used for data collection. The optimization server 4 generates various data collection parameter sets including different values, and obtains reaction information indicating a relation between each of the data collection parameter sets and a reaction ratio.

The optimization server 4 causes a driver reaction model to learn the relations between the notification parameter sets and the reaction ratios through machine learning by using the obtained reaction information. For example, each time reaction information is obtained through the data collection operation, the optimization server 4 causes the driver reaction model to perform additional learning by using the obtained reaction information.

In the service operation, the optimization server 4 decides on an optimal parameter set, which is a notification parameter set with which the reaction ratio of the driver is estimated to become the highest, by using the driver reaction model trained through the additional learning using the obtained reaction information. The optimization server 4 transmits the decided optimal parameter set to the alerting device 3, and the alerting device 3 executes a notification by using the optimal parameter set via the HMI device 6.

Moreover, in the service operation, the optimization server 4 obtains reaction information indicating a relation between the optimal parameter set and a reaction ratio. The optimization server 4 causes the driver reaction model to further perform additional learning also by using the obtained reaction information.

Thus, the optimization server 4 can decide on the optimal parameter set in such a manner that as the driver reaction model iterates additional learning more times, a notification with a higher reaction ratio (that is, a notification of which the acceptability to the driver is higher) can be executed.

[Configuration of Alerting Device]

FIG. 5 shows a configuration of the alerting device 3 included in the vehicle 2.

The alerting device 3 includes a processor 30, a memory 31, and first communication equipment 32. The first communication equipment 32 is a transmitter and receiver for the alerting device 3 to communicate with the optimization server 4. The memory 31 is configured by using, for example, a volatile and/or non-volatile semiconductor memory, and/or a hard disk device or the like. A reaction log 37 is stored in the memory 31 by a behavior recording unit 36, which will be described later.

The processor 30 is, for example, a computer including a CPU or the like. The processor 30 may include a ROM in which a program is written, a RAM for temporarily storing data, and the like. The processor 30 includes, as functional elements or functional units, a gaze measurement unit 33, a notification unit 34, a determination unit 35, and the behavior recording unit 36.

The functional elements included in the processor 30 are implemented, for example, by the processor 30, which is a computer, executing a program 38 stored in the memory 31. Note that the program 38 can be stored in an arbitrary computer-readable storage medium. Instead, all, or one or some, of the functional elements included in the processor 30 can also be configured by using hardware including one or more electronic circuit parts for each functional element.

The gaze measurement unit 33 constantly detects gaze dwelling of the driver of the vehicle 2 and measures the length of time of the gaze dwelling (gaze dwell time). For example, the gaze measurement unit 33 measures the gaze dwell time of the driver by performing eye tracking based on a face image of the driver acquired from the interior camera 11, according to a conventional technology. In the present embodiment, when the vehicle 2 enters and/or passes an intersection, where drivers' attention to a traffic environment is even more important, the gaze measurement unit 33 measures the gaze dwell time of the driver.

When the gaze dwell time calculated by the gaze measurement unit 33 exceeds a predetermined threshold, the notification unit 34 executes a notification to the driver of the vehicle 2 via the HMI device 6 to notify the possibility of the driver being in a distracted state, according to a notification parameter set (that is, the above-described data collection parameter set or optimal parameter set) received from the optimization server 4. Moreover, the notification is executed at a conspicuousness level defined by a parameter in the notification parameter set.

In the present embodiment, the notification parameter set includes two parameter values, namely, a threshold a, which is a parameter defining a timing of outputting a notification, and a constant b, which is a parameter defining a conspicuousness level of the notification, as shown in an expression (1).

$$\text{Notification parameter set}=(a,b) \quad (1)$$

Based on the threshold a included in the notification parameter set, the notification unit 34 starts causing the HMI device 6 to output a notification when the gaze dwell time Ts calculated by the gaze measurement unit 33 exceeds the threshold a, that is, when an expression (2) is satisfied. The notification is executed at a conspicuousness level SL given by an expression (3) using the constant b included in the notification parameter set, which is the parameter defining the conspicuousness level of the notification.

$$Ts > a \quad (2)$$

$$SL = b \quad (3)$$

Here, the conspicuousness level is a degree of intensity with which a stimulus outputted by the HMI device 6 attracts or draws attention of a person.

For example, when a tactile stimulus is outputted as tensile force of an electric seat belt, the conspicuousness level of the tactile stimulus corresponds to the magnitude of the tensile force. The larger the tensile force is, the higher conspicuousness level of the tactile stimulus the tensile force provides.

Moreover, for example, the conspicuousness level of an auditory stimulus corresponds to the intensity of, the frequency of, the degree of shortness of the cycle of repetition of, and/or the degree of shortness of the cycle of change in intensity or frequency of sound, which is an auditory stimulus. The larger the intensity of sound is, the higher the frequency of sound is, the shorter the cycle of repetition of sound is, and/or the shorter the cycle of change in intensity or frequency of sound is, the higher conspicuousness level of the auditory stimulus the sound provides.

Alternatively, when a tactile stimulus is vibrations imparted to the hands of the driver from an oscillatory actuator installed at the steering wheel 22 as described above, the conspicuousness level of the tactile stimulus corresponds to the intensity of, the frequency of, the degree of shortness of the cycle of repetition of, and/or the degree of shortness of the cycle of change in intensity or frequency of the vibrations. The larger the intensity of vibrations is, the higher the frequency of vibrations is, the shorter the cycle of repetition of vibrations is, and/or the shorter the cycle of change in intensity or frequency of vibrations is, the higher conspicuousness level of the tactile stimulus the vibrations provide.

Alternatively, when visual information is outputted as a graphic element, such as a character or a graphic, displayed on the display device, the conspicuousness level of the visual information can be determined by the brightness of, the cycle of change in brightness of, the cycle of blinking of, or the color of the displayed graphic element. For example, as the brightness becomes higher, as the cycle of change in brightness or the cycle of blinking becomes shorter, or as the color becomes closer to a warm color from a cold color, the conspicuousness level of the visual information becomes higher.

Note that correspondences between sizes of the conspicuousness level SL and details of the forms of the tactile stimulus, the auditory stimulus, and/or the visual information (the above-described intensity, frequency, tensile force, brightness, changes in brightness, and the like of the various stimuli or visual information) can be predetermined and stored in the memory 31 beforehand.

The notification unit 34 can refer to information on the correspondences and execute a notification to the driver via the HMI device 6 through the tactile stimulus, the auditory stimulus, and/or the visual information in a form according to the determined size of the conspicuousness level SL.

As described above, in the present embodiment, there are two types of notification parameter sets, the data collection parameter set and the optimal parameter set. The notification unit 34 executes a notification to the driver via the HMI device 6 by using the data collection parameter set or the optimal parameter set, according to an instruction from the optimization server 4 (for example, according to execution order information, which will be described later).

When the notification unit 34 executes a notification via the HMI device 6 at an output timing and a conspicuousness level indicated by a notification parameter set decided on by the optimization server 4, the determination unit 35 determines whether or not a reactive behavior of the driver to the notification occurs.

Specifically, the determination unit 35 acquires a change in behavior related to driving made by the vehicle 2 before a predetermined time period elapses after the notification unit 34 executes the notification via the HMI device 6 (for example, within two seconds after output of the notification is started), as a reactive behavior exhibited by the driver in response to the notification. In the present embodiment, for example, the determination unit 35 determines presence or absence of the reactive behavior, based on whether or not the amount of gaze movement between two temporally consecutive points of gaze, in gaze movement of the driver, is a predetermined amount or more, and/or whether or not the size of the range of gaze movement of the driver is a predetermined size or more. The determination unit 35 determines that the reactive behavior occurs when the amount of gaze movement between the points of gaze is the predetermined amount or more, and/or when the size of the range of gaze movement of the driver is the predetermined size or more.

When the notification unit 34 executes the notification via the HMI device 6 at the output timing and the conspicuousness level indicated by the notification parameter set decided on by the optimization server 4, the behavior recording unit 36 records whether or not a reactive behavior of the driver to the notification occurs.

Specifically, based on a result of the determination by the determination unit 35 as to the presence or absence of a reactive behavior, the behavior recording unit 36 stores, in the reaction log 37 stored in the memory 31, a reaction record in which the notification parameter set used for the notification is associated with the result of the determination as to the presence or absence of a reactive behavior to the notification.

The behavior recording unit 36 transmits the reaction record stored in the reaction log 37 to the optimization server 4 at the end of an update period, which will be described later.

[Configuration of Optimization Server]

Figure 6:
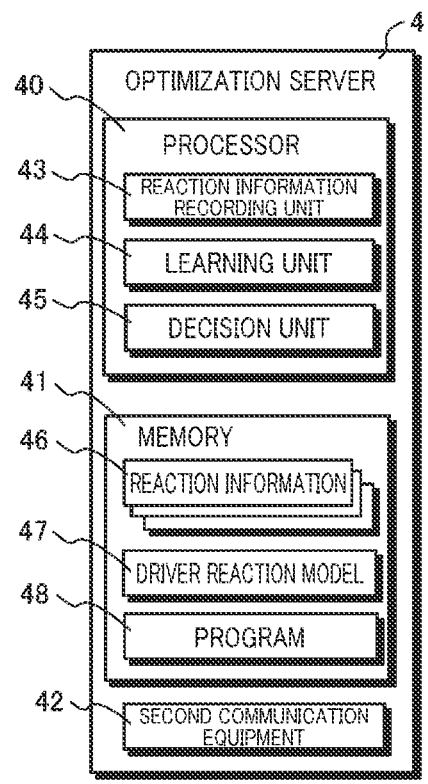
FIG. 6 shows a configuration of an optimization server included in the alerting system.

FIG. 6 shows a configuration of the optimization server 4.

The optimization server 4 includes a processor 40, a memory 41, and second communication equipment 42. The second communication equipment 42 is a transmitter and receiver for the optimization server 4 to communicate with the alerting device 3. The memory 41 is configured by using, for example, a volatile and/or non-volatile semiconductor memory, and/or a hard disk device or the like. In the memory 41, reaction information 46 generated by a reaction information recording unit 43, which will be described later, and a driver reaction model 47 that is caused to perform machine learning by a learning unit 44 are stored.

The processor 40 is, for example, a computer including a CPU or the like. The processor 40 may include a ROM in which a program is written, a RAM for temporarily storing data, and the like. The processor 40 includes, as functional elements or functional units, the reaction information recording unit 43, the learning unit 44, and a decision unit 45.

The functional elements included in the processor 40 are implemented, for example, by the processor 40, which is a computer, executing a program 48 stored in the memory 41. Note that the program 48 can be stored in an arbitrary computer-readable storage medium. Instead, all, or one or some, of the functional elements included in the processor 40 can also be configured by using hardware including one or more electronic circuit parts for each functional element.

For each of mutually different notification parameter sets, the reaction information recording unit 43 calculates a reaction ratio, which is the ratio of the number of times the driver exhibits a reactive behavior in response to a notification to the number of notifications executed by using the notification parameter set, based on reaction records transmitted from the alerting device 3 of the vehicle 2. Moreover, for each of the mutually different notification parameter sets, the reaction information recording unit 43 generates reaction information 46 in which the notification parameter set is associated with the reaction ratio about notifications using the notification parameter set. The reaction information recording unit 43 stores the generated reaction information 46 in the memory 41.

The learning unit 44 causes the driver reaction model 47 stored in the memory 41 to learn a relation between a notification parameter set and a reaction ratio through machine learning by using the reaction information 46 that the reaction information recording unit 43 has stored in the memory 41. The driver reaction model 47 can be configured, for example, by using a neural network according to a conventional technology.

Each time the reaction information recording unit 43 stores new reaction information 46 based on reaction records received from the alerting device 3 of the vehicle 2 (for example, each time an update period, which will be described later, comes to an end), the learning unit 44 causes the driver reaction model 47 to perform additional learning by using the newly stored reaction information 46. Thus, each time new reaction information is generated based on new reaction records received from the alerting device 3, the driver reaction model 47 stored in the memory 41 is updated so as to be able to perform prediction with higher accuracy.

The decision unit 45 decides on a notification parameter set that defines operation for a notification that is executed via the HMI device 6 by the notification unit 34 of the alerting device 3 included in the vehicle 2. In the present embodiment, each notification parameter set includes the threshold a, which is a parameter defining a timing of outputting a notification, and the constant b, which are parameters defining a conspicuousness level of the notification, as shown in the expression (1) mentioned above.

In the present embodiment, the decision unit 45 decides on, as notification parameter sets, a data collection parameter set, which is a notification parameter set for data collection, and an optimal parameter set, which is a notification parameter set for service.

The data collection parameter set is a notification parameter set to be exclusively used for the alerting device 3 included in the vehicle 2 to perform the data collection operation. In the data collection operation, reaction information is collected by using, for example, at random, various data collection parameter sets including different values.

For example, the decision unit 45 decides on each data collection parameter set at random. In other words, the decision unit 45 decides on a value of the threshold a and values of the constant b to be included in a notification parameter set by choosing from respective predetermined value ranges at random, and thus generates the data collection parameter set including the decided threshold a and constant b.

The optimal parameter set is a notification parameter set for allowing the alerting device 3 included in the vehicle 2 to perform the service operation of executing a notification in a form easily acceptable to the driver. Specifically, the decision unit 45 calculates a notification parameter set with which the reaction ratio is estimated to become the highest, based on relations between various notification parameter sets and reaction ratios, and decides on the calculated notification parameter set as an optimal parameter set.

In the present embodiment, by using the driver reaction model 47 that has learned relations between various notification parameter sets and reaction ratios, a notification parameter set with which the reaction ratio is estimated to become the highest is calculated, and the calculated notification parameter set is decided on as an optimal parameter set.

The decision unit 45 sets a predetermined period and, during the predetermined period, selectively performs the data collection operation using the decided data collection parameter sets and the service operation using the decided optimal parameter set in cooperation with the alerting device 3. In the present embodiment, the predetermined period is an update period until the decided optimal parameter set is updated next (that is, a period until a new optimal parameter set is decided on).

Then, during the update period, the decision unit 45 executes notifications selectively using the decided optimal parameter set and the plurality of data collection parameter sets in cooperation with the notification unit 34, the behavior recording unit 36, and the reaction information recording unit 43, and obtains reaction information with respect to the optimal parameter set and the data collection parameter sets used for the notifications.

Specifically, the decision unit 45 first decides on an optimal parameter set by using the driver reaction model 47 and sets an update period, which is a period until the decided optimal parameter set is updated next. Moreover, the decision unit 45 generates a plurality of data collection parameter sets to be used during the update period. Here, the update period can be set as a period with a predetermined length of time, or a period during which a predetermined number of notifications are executed by the notification unit 34.

The decision unit 45 further generates execution order information that defines in what order the notification unit 34 of the alerting device 3 executes a notification using the optimal parameter set and notifications using the plurality of data collection parameter sets, for a plurality of notifications to be executed during the update period.

For example, the decision unit 45 sets the number of notifications using the data collection parameter sets (hereinafter, data collection notification) and the number of notifications using the optimal parameter set (hereinafter, service notification) to be executed during the update period. Then, the decision unit 45 generates execution order information that defines order of the data collection notifications and the service notifications at random. For example, the execution order information defines that a first notification after the update period begins is a data collection notification, second and third notifications are service notifications, a fourth, and so on. As described above, the execution order information can be configured to define which of a data collection notification and a service notification is given for an n-th (n>1) notification after the update period begins.

Here, the number of the data collection notifications and the number of the service notifications, which are determined when the execution order information is generated, can be set, for example, depending on the learning status of the driver reaction model 47 (for example, the number of pieces of reaction information used in learning so far). More specifically, the number of the data collection notifications and the number of the service notifications can be set in such a manner that the ratio of the number of the data collection notifications to the number of the service notifications decreases as the driver reaction model 47 learns more (for example, as the number of pieces of reaction information used in learning so for increases).

The decision unit 45 transmits the decided optimal parameter set, the decided data collection parameter sets, the generated execution order information, and information on the determined update period to the alerting device 3. Thus, the determined update period begins, and the notification unit 34 of the alerting device 3 executes a data collection notification or a service notification in accordance with the execution order information. Moreover, the behavior recording unit 36 of the alerting device 3 stores, in the reaction log 37, a reaction record indicating whether or not a reactive behavior of the driver occurs when each of the data collection notifications and the service notifications is executed. Note that the notification unit 34 can be configured to repeatedly use the execution order information by going back to the beginning of the execution order information when the number of notifications executed during the update period exceeds the number of notifications included in the execution order information.

When the update period expires, the behavior recording unit 36 transmits the reaction records stored in the reaction log 37 to the optimization server 4. The reaction information recording unit 43 of the optimization server 4 receives the reaction records and generates reaction information. Moreover, the learning unit 44 of the optimization server 4 causes the driver reaction model 47 to perform additional learning by using the generated reaction information.

Subsequently, the decision unit 45 decides on a new optimal parameter set (that is, updates the optimal parameter set) by using the driver reaction model 47 trained through the additional learning, and determines, decides on or generates a next update period, new data collection parameter sets, and new execution order information. The decision unit 45 transmits the new optimal parameter set, data collection parameter sets, execution order information, and information on the new update period to the alerting device 3, and operation for the new update period starts.

Thereafter, as described above, an update period is repeated, and in each of the update periods, data collection notifications and service notifications are executed in a mixed manner (that is, in each update period, the data collection operation and the service operation are repeated).

[Operation Flow in Alerting System]

Next, an operational procedure in the alerting system 1 is described. FIG. 7 is a flowchart of the operational procedure for an alerting method executed by the computers in the alerting system 1 (that is, the processor 30 of the alerting device 3 and the processor 40 of the optimization server 4). Processing shown in FIG. 7 is executed repeatedly.

When the processing is started, first, the decision unit 45 of the optimization server 4 calculates, by using the driver reaction model 47, and decides on an optimal parameter set that is a notification parameter set with which the reaction ratio of the driver is estimated to become the highest (S100). Moreover, the decision unit 45 determines an update period until the decided optimal parameter set is updated next, and decides on a plurality of data collection parameter sets that is notification parameter sets to be exclusively used for data collection during the update period (S102). The decision unit 45 transmits the decided optimal parameter set, the decided data collection parameter sets, and information on the determined update period to the alerting device 3. Thus, the update period begins in the alerting device 3. When transmitting the optimal parameter set and the like, the decision unit 45 may generate and transmit, to the alerting device 3, execution order information that defines order in which the optimal parameter set and the data collection parameter sets are used during the update period.

Next, the notification unit 34 of the alerting device 3 executes either a data collection notification, which is a notification using a data collection parameter set, or a service notification, which is a notification using the optimal parameter set, for example, in accordance with the execution order information (S104). The notification is executed via the HMI device 6 at a conspicuousness level SL given by the expression (3) when the gaze dwell time Ts satisfies the expression (2), in accordance with each notification parameter set.

Then, each time a notification is outputted from the HMI device 6, the behavior recording unit 36 of the alerting device 3 stores a reaction record, which is a record of the presence or absence of a reactive behavior of the driver, in the reaction log 37 in the memory 31, based on a result of determination performed by the determination unit 35 as to the presence or absence of a reactive behavior of the driver (S104). Here, the presence or absence of a reactive behavior to a notification is determined based on whether or not the driver exhibits a reactive behavior within a first predetermined time period (for example, two seconds) of the start of the notification.

When no reactive behavior is exhibited within the first predetermined time period, the notification unit 34 may repeat a notification while changing notification parameter sets until the driver exhibits a reactive behavior. For example, the notification unit 34 determines whether or not the driver exhibits a reactive behavior within a second predetermined time period (for example, 10 seconds) of the notification being given (S108). The notification unit 34 can be configured to return to step S104 and repeat the processing when the driver does not exhibit a reactive behavior within the second predetermined time period (S108, NO).

When the driver exhibits a reactive behavior within the second predetermined time period (S108, YES), the notification unit 34 determines whether or not the update period comes to an end (S110). When the update period does not come to an end (S110, NO), the notification unit 34 returns to step S104 and repeats the processing.

When the update period comes to an end (S110, YES), the behavior recording unit 36 transmits reaction records collected during the update period and stored in the reaction log 37 to the optimization server 4. The reaction information recording unit 43 of the optimization server 4 generates reaction information 46 based on the received reaction records and stores the reaction information 46 in the memory 41 (S112). The learning unit 44 causes the driver reaction model 47 to perform addition learning by using the reaction information 46 stored in the memory 41, and then the present processing is terminated.

After the present processing is terminated, the alerting system 1 starts the processing again from step S100 and repeats the above-described data collection operation and service operation.

OTHER EMBODIMENTS

Although data collection parameter sets are decided on for each update period in the embodiment, one or some or all of data collection parameter sets may be used across a plurality of update periods.

In the embodiment, the decision unit 45 generates execution order information by setting order at random in which the data collection parameter sets and the optimal parameter set are used, and the notification unit 34 executes a notification by using one of the plurality of data collection parameter sets and the optimal parameter set in accordance with the execution order information. Instead, the decision unit 45 may omit to generate execution order information, and the notification unit 34 may decide on, at random, which one of the plurality of data collection parameter sets and the optimal parameter set is used, and execute a notification.

Although the decision unit 45 decides on a plurality of data collection parameter sets for each update period in the embodiment, at least one data collection parameter set may be decided on for each update period.

In the embodiment, the decision unit 45 of the optimization server 4 selectively performs the data collection operation using a data collection parameter set and the service operation using an optimal parameter set in a mixed manner during an update period. However, the data collection operation and the service operation do not necessarily need to be selectively performed in a mixed manner during an update period, and the data collection operation and the service operation may be performed separately in different periods, respectively. The above-mentioned period can be a period with a predetermined length of time or a period during which a predetermined number of notifications are executed by the notification unit 34.

In the embodiment, the decision unit 45 decides on an optimal parameter set by using the driver reaction model 47 that is trained through machine learning based on reaction information generated by the reaction information recording unit 43. However, use of the driver reaction model 47 is one scheme for deciding on an optimal parameter set, and the decision unit 45 can be configured to decide on an optimal parameter set by using another arbitrary scheme that does not use the driver reaction model 47, based on relations between notification parameter sets and reaction ratios indicated by the reaction information.

Examples of such another scheme can include multivariate analysis (for example, analysis of covariance) of each parameter included in a notification parameter set (for example, the threshold a and constants b and c) and a reaction ratio.

Although the decision unit 45 decides on a data collection parameter set by setting, at random, the value of each parameter included in the notification parameter set in the embodiment, a method of determining a data collection parameter set is not limited to such a method (of determining values at random). For example, the decision unit 45 may use a genetic algorithm approach and may perform an operation, such as selection, crossover, and/or mutation, on a value set for the parameters included in a notification parameter set to generate a new generation of the value set, and decides on a notification parameter set having the generated generation of the value set as a data collection parameter set.

Alternatively, the decision unit 45 may use a stochastic approach, such as best arm identification, based on reaction information obtained so far, and may decide on a notification parameter set with which a higher reaction ratio as a reward is estimated to be gained, as a data collection parameter set and/or an optimal parameter set.

Although the one driver reaction model 47 is used in the embodiment, a driver reaction model 47 may be created for each driver when a plurality of drivers drives the vehicle 2 in turn.

Although the alerting system 1 includes the alerting device 3 mounted in the vehicle 2 and the optimization server 4 provided outside of the vehicle 2 in the embodiment, the alerting system 1 is not limited to such a configuration. All of the above-described functional elements included in the optimization server 4 and the above-described functional elements included in the alerting device 3 may be included in the vehicle 2. For example, the reaction information recording unit 43, the learning unit 44, and the decision unit 45 included in the optimization server 4 may be included in the processor 30 of the alerting device 3, and the driver reaction model 47 may be stored in the memory 31, so that the alerting system 1 may be implemented only by the alerting device 3.

Alternatively, all of the above-described functional elements included in the alerting device 3 and the above-described functional elements included in the optimization server 4 in the embodiment may be included in an external server device outside of the vehicle 2. For example, the gaze measurement unit 33, the notification unit 34, the determination unit 35, and the behavior recording unit 36 included in the alerting device 3 may be included in the processor 40 of the optimization server 4. In such a case, the optimization server 4 and each device (the HMI device 6, the object detection device 7, the exterior camera 8, and the like) in the vehicle 2 can be configured to be communicably connected to each other.

The present invention is not limited to the above-described configurations in the embodiment, and can be implemented in various aspects without departing from the gist thereof.

[Configurations Supported by the Embodiment]

The above-described embodiment supports following configurations.

(Configuration 1) An alerting system including: a gaze measurement unit that measures a gaze dwell time of a driver of a vehicle; and a notification unit that, when the measured gaze dwell time exceeds a predetermined threshold, executes a notification at a predetermined conspicuousness level to the driver via an HMI device, the alerting system further including: a decision unit that decides on a notification parameter set including a parameter defining an output timing of outputting the notification and a parameter defining the conspicuousness level of the notification outputted from the HMI device; a behavior recording unit that, when the notification unit executes the notification at the output timing and the conspicuousness level indicated by the decided notification parameter set, records whether or not a reactive behavior of the driver to the notification occurs; and a reaction information recording unit that calculates a reaction ratio with respect to each of the different notification parameter sets and records, in a storage device, reaction information in which the notification parameter set and the reaction ratio are associated, the reaction ratio being a ratio of the number of times the driver exhibits the reactive behavior in response to the notification to the number of the notifications executed, wherein the decision unit calculates and decides on an optimal parameter set, based on relations between the notification parameter sets and the reaction ratios indicated by the reaction information, the optimal parameter set being the notification parameter set with which the reaction ratio is estimated to become the highest.

According to the alerting system in configuration 1, the acceptability, to the driver, of a notification concerning a distracted state is assessed as a reaction ratio related to a reaction of the driver to the notification, and a notification parameter set that defines a form of a notification is calculated in such a manner that the reaction ratio becomes the highest. Accordingly, the possibility of a distracted state can be notified in the form easily acceptable to the driver of the vehicle.

(Configuration 2) The alerting system according to configuration 1, wherein the decision unit further determines an update period and decides on at least one data collection parameter set, the update period being a period until the decided optimal parameter set is updated next, the data collection parameter set being the notification parameter set to be exclusively used for data collection, executes the notifications by selectively using the decided optimal parameter set and the decided data collection parameter set during the update period in cooperation with the notification unit, the behavior recording unit, and the reaction information recording unit, and obtains the reaction information with respect to the used optimal parameter set and the used data collection parameter set.

According to the alerting system in configuration 2, since the data collection operation and the service operation are performed in a distributed manner during the same update period, a feeling of strangeness felt by the driver about a notification using a data collection parameter set can be reduced.

(Configuration 3) The alerting system according to configuration 2, wherein the update period is set as a period with a predetermined length of time, or a period during which a predetermined number of the notifications are executed by the notification unit.

According to the alerting system in configuration 3, the data amount of reaction records collected during an update period can be controlled by using the length of time of the update period or the number of notifications to be executed.

(Configuration 4) The alerting system according to configuration 2 or 3, wherein the decision unit generates execution order information that defines in what order the notification unit executes the notification using the optimal parameter set and the notification using the data collection parameter set, for a plurality of the notifications to be executed during the update period, and the notification unit executes the notification by selecting and using the optimal parameter set or the data collection parameter set in accordance with the execution order information.

According to the alerting system in configuration 4, since the notification unit can select a notification parameter set in accordance with the execution order information, the processing is simplified.

(Configuration 5) The alerting system according to any one of configurations 1 to 4, further including a learning unit that causes a driver reaction model to learn, through machine learning, the relations between the notification parameter sets and the reaction ratios, based on the reaction information, wherein the decision unit decides on the optimal parameter set with which the reaction ratio is estimated to become the highest, by using the driver reaction model.

According to the alerting system in configuration 5, it is possible to easily decide on an optimal parameter set with which the reaction ratio is estimated to become the highest.

(Configuration 6) The alerting system according to any one of configurations 1 to 5, wherein the gaze measurement unit measures the gaze dwell time of the driver when the vehicle enters an intersection, and/or when the vehicle passes an intersection.

According to the alerting system in configuration 6, at an intersection, where drivers' attention is even more important, concentration on driving behavior can be urged by executing a notification concerning a distracted state of the driver.

(Configuration 7) The alerting system according to any one of configurations 1 to 6, wherein the gaze measurement unit measures the gaze dwell time of the driver by using eye tracking based on a face image of the driver from a camera included in a vehicle cabin of the vehicle.

According to the alerting system in configuration 7, the gaze dwell time can be easily measured by using eye tracking based on a camera image, without using special equipment.

(Configuration 8) The alerting system according to any one of configurations 1 to 7, wherein presence or absence of the reactive behavior is determined based on whether or not an amount of gaze movement between two temporally consecutive points of gaze, in gaze movement of the driver, is a predetermined amount or more, and/or whether or not a size of a range of gaze movement of the driver is a predetermined size or more.

According to the alerting system in configuration 8, the presence or absence of a reaction of the driver to a notification concerning a distracted state can be easily determined from an aspect of gaze movement of the driver in the vehicle.

(Configuration 9) The alerting system according to any one of configurations 1 to 8, wherein the HMI device includes a tactile HMI device, an auditory HMI device, and/or a visual HMI device.

According to the alerting system in configuration 9, notifications in various forms can be given to the driver by using the various HMI devices.

(Configuration 10) The alerting system according to any one of configurations 1 to 9, further including a server device communicably connected to the vehicle, wherein the server device includes the decision unit and the reaction information recording unit, and the vehicle includes the gaze measurement unit and the notification unit.

According to the alerting system in configuration 10, since the processing can be performed by the server device and the in-vehicle devices in a distributed manner, for example, loads on the in-vehicle devices can be mitigated, so that vehicle cost can be reduced.

(Configuration 11) The alerting system according to any one of configurations 1 to 9, wherein the decision unit, the reaction information recording unit, the gaze measurement unit, and the notification unit are included in the vehicle.

According to the alerting system in configuration 11, since the whole alerting system can be mounted in the vehicle, it is possible to perform more stable processing that is unaffected by congestion of communication lines and the like occurring outside of the vehicle.

(Configuration 12) An alerting method that is executed by a computer of an alerting system in which a notification is given from an HMI device to a driver of a vehicle, the alerting method including: a gaze measurement step of measuring a gaze dwell time of the driver of the vehicle; and a notification step of, when the measured gaze dwell time exceeds a predetermined threshold, executing a notification to the driver via the HMI device, the alerting method further including: a decision step of deciding on a notification parameter set including a parameter defining an output timing of outputting the notification and a parameter defining a conspicuousness level of the notification outputted from the HMI device; a behavior recording step of, when the notification is executed in the notification step at the output timing and the conspicuousness level indicated by the decided notification parameter set, recording whether or not a reactive behavior of the driver to the notification occurs; and a reaction information recording step of calculating a reaction ratio with respect to each of the different notification parameter sets and recording, in a storage device, reaction information in which the notification parameter set and the reaction ratio are associated, the reaction ratio being a ratio of the number of times the driver exhibits the reactive behavior in response to the notification to the number of the notifications executed, wherein in the decision step, an optimal parameter set is calculated and decided on based on relations between the various notification parameter sets and the reaction ratios, the optimal parameter set being the notification parameter set with which the reaction ratio is estimated to become the highest.

According to the alerting method in configuration 12, the acceptability, to the driver, of a notification concerning a distracted state is assessed as a reaction ratio related to a reaction of the driver to the notification, and a notification parameter set that defines a form of a notification is calculated in such a manner that the reaction ratio becomes the highest. Accordingly, the possibility of a distracted state can be notified in the form easily acceptable to the driver of the vehicle.

REFERENCE SIGNS LIST 1 alerting system, 2 vehicle, 3 alerting device, 4 optimization server, 5 communication network, 6 HMI device, 6a tactile HMI device, 6b auditory HMI device, 6c visual HMI device, 7 object detection device, 8 exterior camera, 8a front camera, 8b left side camera, 8c right side camera, 8d rear camera, 9 GPS device, 10 vehicle control device, 11 interior camera, 12 rear-view mirror, 13a, 13b side-view mirror, 14 intersection, 15 preceding vehicle, 20 driver seat, 21 seat belt, 22 steering wheel, 23 dashboard, 24 display device, 25 windshield, 30 processor, 31 memory, 32 first communication equipment, 33 gaze measurement unit, 34 notification unit, 35 determination unit, 36 behavior recording unit, 37 reaction log, 38, 48 program, 40 processor, 41 memory, 42 second communication equipment, 43 reaction information recording unit, 44 learning unit, 45 decision unit, 46 reaction information, 47 driver reaction model, 60 line

What is claimed is:

1. An alerting system comprising: a gaze measurement unit that measures a gaze dwell time of a driver of a vehicle; and a notification unit that, when the measured gaze dwell time exceeds a predetermined threshold, executes a notification at a predetermined conspicuousness level to the driver via an HMI (Human Machine Interface) device, the alerting system further comprising:
    a decision unit that decides on a notification parameter set including a parameter defining an output timing of outputting the notification and a parameter defining the conspicuousness level of the notification outputted from the HMI device;
    a behavior recording unit that, when the notification unit executes the notification at the output timing and the conspicuousness level indicated by the decided notification parameter set, records whether or not a reactive behavior of the driver to the notification occurs; and
    a reaction information recording unit that calculates a reaction ratio with respect to each of the different notification parameter sets and records, in a storage device, reaction information in which the notification parameter set and the reaction ratio are associated, the reaction ratio being a ratio of the number of times the driver exhibits the reactive behavior in response to the notification to the number of the notifications executed,
    wherein the decision unit calculates and decides on an optimal parameter set, based on relations between the notification parameter sets and the reaction ratios indicated by the reaction information, the optimal parameter set being the notification parameter set with which the reaction ratio is estimated to become the highest.

2. The alerting system according to claim 1, wherein the decision unit further determines an update period and decides on at least one data collection parameter set, the update period being a period until the decided optimal parameter set is updated next, the data collection parameter set being the notification parameter set to be exclusively used for data collection, executes the notifications selectively using the decided optimal parameter set and the decided data collection parameter set during the update period in cooperation with the notification unit, the behavior recording unit, and the reaction information recording unit, and obtains the reaction information with respect to the used optimal parameter set and the used data collection parameter set.

3. The alerting system according to claim 2, wherein the update period is set as a period with a predetermined length of time, or a period during which a predetermined number of the notifications are executed by the notification unit.

4. The alerting system according to claim 2, wherein
    the decision unit generates execution order information that defines in what order the notification unit executes the notification using the optimal parameter set and the notification using the data collection parameter set, for a plurality of the notifications to be executed during the update period, and the notification unit executes the notification by selecting and using the optimal parameter set or the data collection parameter set in accordance with the execution order information.

5. The alerting system according to claim 1, further comprising a learning unit that causes a driver reaction model to learn, through machine learning, the relations between the notification parameter sets and the reaction ratios, based on the reaction information, wherein the decision unit decides on the optimal parameter set with which the reaction ratio is estimated to become the highest, by using the driver reaction model.

6. The alerting system according to claim 1, wherein the gaze measurement unit measures the gaze dwell time of the driver when the vehicle enters an intersection, and/or when the vehicle passes an intersection.

7. The alerting system according to claim 1, wherein the gaze measurement unit measures the gaze dwell time of the driver by using eye tracking based on a face image of the driver from a camera included in a vehicle cabin of the vehicle.

8. The alerting system according to claim 1, wherein presence or absence of the reactive behavior is determined based on whether or not an amount of gaze movement between two temporally consecutive points of gaze, in gaze movement of the driver, is a predetermined amount or more, and/or whether or not a size of a range of gaze movement of the driver is a predetermined size or more.

9. The alerting system according to claim 1, wherein the HMI device includes a tactile HMI device, an auditory HMI device, and/or a visual HMI device.

10. The alerting system according to claim 1, further comprising a server device communicably connected to the vehicle, wherein the server device includes the decision unit and the reaction information recording unit, and the vehicle includes the gaze measurement unit and the notification unit.

11. The alerting system according to claim 1, wherein the decision unit, the reaction information recording unit, the gaze measurement unit, and the notification unit are included in the vehicle.

12. An alerting method that is executed by a computer of an alerting system in which a notification is given from an HMI (Human Machine Interface) device to a driver of a vehicle, the alerting method comprising: a gaze measurement step of measuring a gaze dwell time of the driver of the vehicle; and a notification step of, when the measured gaze dwell time exceeds a predetermined threshold, executing a notification to the driver via the HMI device, the alerting method further comprising:

a decision step of deciding on a notification parameter set including a parameter defining an output timing of outputting the notification and a parameter defining a conspicuousness level of the notification outputted from the HMI device;

a behavior recording step of, when the notification is executed in the notification step at the output timing and the conspicuousness level indicated by the decided notification parameter set, recording whether or not a reactive behavior of the driver to the notification occurs; and a reaction information recording step of calculating a reaction ratio with respect to each of the different notification parameter sets and recording, in a storage device, reaction information in which the notification parameter set and the reaction ratio are associated, the reaction ratio being a ratio of the number of times the driver exhibits the reactive behavior in response to the notification to the number of the notifications executed, wherein in the decision step, an optimal parameter set is calculated and decided on based on relations between the various notification parameter sets and the reaction ratios, the optimal parameter set being the notification parameter set with which the reaction ratio is estimated to become the highest.

* * * * *